US005827452A

United States Patent [19]

Young

[11] Patent Number: 5,827,452

[45] Date of Patent: Oct. 27, 1998

[54] METHOD OF FORMING PHOTOGRAPHIC DISPERSION

[75] Inventor: David J. Young, Chorleywood, United Kingdom

[73] Assignee: Eastman Kodak Company, Rochester, N.Y.

[21] Appl. No.: 706,063

[22] Filed: Aug. 30, 1996

[30] Foreign Application Priority Data

Sep. 2, 1995 [GB] United Kingdom .................. 9517912

[51] Int. Cl.[6] .......................... B01J 13/00; G03C 1/015; G03C 7/32

[52] U.S. Cl. ...................... 252/314; 252/312; 252/315.1; 430/546; 430/631

[58] Field of Search .................................. 252/312, 314, 252/315.1; 430/546, 569

[56] References Cited

U.S. PATENT DOCUMENTS

| | | | |
|---|---|---|---|
| 2,550,211 | 4/1951 | Watters et al. | 252/314 X |
| 2,583,576 | 1/1952 | Kern et al. | 252/312 X |
| 2,801,171 | 7/1957 | Fierke et al. | 430/546 |
| 3,022,172 | 2/1962 | Ohba et al. | 430/628 |
| 3,250,620 | 5/1966 | Lovett et al. | 430/640 |
| 3,277,013 | 10/1966 | Gianladis | 252/312 X |
| 3,335,128 | 8/1967 | Hiatt et al. | 536/59 |
| 3,419,494 | 12/1968 | Teeter et al. | 252/312 X |
| 3,655,407 | 4/1972 | McGraw | 430/627 |
| 3,767,410 | 10/1973 | Brust et al. | 430/637 |
| 3,788,857 | 1/1974 | Van Poucke et al. | 430/546 |
| 3,907,572 | 9/1975 | Ueda et al. | 430/449 |
| 4,004,927 | 1/1977 | Yamamoto et al. | 430/523 |
| 4,166,050 | 8/1979 | Miyazako et al. | 430/539 |
| 4,198,478 | 4/1980 | Yoneyama et al. | 430/499 |
| 4,201,589 | 5/1980 | Sakaguchi et al. | 430/139 |
| 4,211,836 | 7/1980 | Yoneyama et al. | 430/449 |
| 4,252,894 | 2/1981 | Viro et al. | 430/546 X |
| 4,291,113 | 9/1981 | Minamizono et al. | 430/202 |
| 4,569,905 | 2/1986 | Mukunoki et al. | 430/546 |
| 4,751,174 | 6/1988 | Toya | 430/502 |
| 4,788,001 | 11/1988 | Narula | 252/312 |
| 4,908,155 | 3/1990 | Leemans et al. | 430/528 |
| 4,935,338 | 6/1990 | Masuda et al. | 430/631 |
| 4,939,077 | 7/1990 | Helling et al. | 430/527 |
| 5,051,350 | 9/1991 | Terai et al. | 430/569 |
| 5,089,380 | 2/1992 | Bagchi | 430/449 |
| 5,356,768 | 10/1994 | Bertramini et al. | 430/546 |
| 5,358,831 | 10/1994 | Bagchi et al. | 430/499 |
| 5,380,628 | 1/1995 | Sawyer et al. | 430/449 |
| 5,419,848 | 5/1995 | VanEenam | 310/365 |
| 5,549,845 | 8/1996 | Young | 430/546 |

FOREIGN PATENT DOCUMENTS

| | | |
|---|---|---|
| 548062 | 6/1993 | European Pat. Off. . |
| 213768 | 9/1984 | Germany . |
| 276743 | 3/1990 | Germany . |
| 3914947 | 11/1990 | Germany . |
| 288250 | 3/1991 | Germany . |
| 4034871 | 3/1992 | Germany . |
| 4-76543 | 3/1992 | Japan . |
| 92/01971 | 2/1992 | WIPO . |

OTHER PUBLICATIONS

"Ullmanns Encyklopädie der technischen Chemie", vol. 10, 4th edn., Weinheim Verlag Chemie, 1975.

*Primary Examiner*—Richard D. Lovering
*Attorney, Agent, or Firm*—Andrew J. Anderson

[57] ABSTRACT

This invention provides an oil-in-water emulsion, particularly a photographic dispersion, having a reduced droplet size in the oil phase obtained by an increase in the viscosity of the aqueous phase prior to homogenization of the oil and aqueous phases; methods of forming thereof and to the use of the emulsion in a silver halide based photographic system.

15 Claims, 6 Drawing Sheets

METHOD OF FORMING PHOTOGRAPHIC DISPERSION

TECHNICAL FIELD

The present invention relates to oil-in-water emulsions, and in particular to improved photographic dispersions which comprise an aqueous gel continuous phase and a dispersed oil phase which comprises droplets of a photographically useful compound such as an image dye-forming coupler dissolved in one or more organic coupler solvents.

BACKGROUND OF THE INVENTION

Photographic additives are usually incorporated into photographic systems as a colloidal emulsion, usually called a dispersion in the photographic art. The additives are very often water insoluble or substantially water insoluble and this characteristic makes the preparation of the dispersion difficult especially where small particles are desired. To prepare these dispersions, the photographic additives are added to a high boiling water immiscible solvent, generally called a permanent coupler solvent. At times, a low boiling solvent or a water miscible solvent (generally called an auxiliary solvent) is added to promote the solubility of the photographic additives. The thus formed mixture is heated to form a solution. This solution is typically mixed under high shear, together with an aqueous gelatin solution, generally containing a surfactant at elevated temperatures in order to break the organic phase (oil phase) into sub-micron droplets dispersed in the continuous aqueous phase. When an auxiliary solvent is employed, it is removed from the dispersion prior to the employment of the dispersion in the preparation of a photographic element. With reference to the photographic art, it has been found that the reactivity of image-dye-forming coupler in a photographic dispersion is normally inversely related to the droplet size of the organic disperse phase of the dispersion. It is desirable therefore to provide photographic dispersions having as small a droplet size as possible.

In particular, the present invention relates to a method of decreasing the droplet size of the organic discontinuous phase. Whilst the invention is particularly described herein with reference to photographic dispersions, it will be appreciated by a person skilled in the art that the invention can be applied in other fields of technology in which oil-in-water emulsions are required to have a discontinuous phase with a small droplet size.

SUMMARY OF THE INVENTION

According to one aspect of the present invention there is provided an oil-in-water emulsion having a reduced droplet size in the oil phase obtained by an increase in the viscosity of the aqueous phase prior to homogenization of the oil and aqueous phases.

In another aspect there is provided a method of forming an oil-in-water emulsion, comprising homogenizing the oil and aqueous phases of the emulsion and characterized by a reduction of the droplet size of the oil phase by increasing the viscosity of the aqueous phase prior to homogenization.

Preferably the viscosity of the aqueous phase is in the range of about 20 cP to about 2500 cP and the increase in viscosity is by a factor of from about 3 to about 50 inclusive.

DETAILED DESCRIPTION

Figure 1:
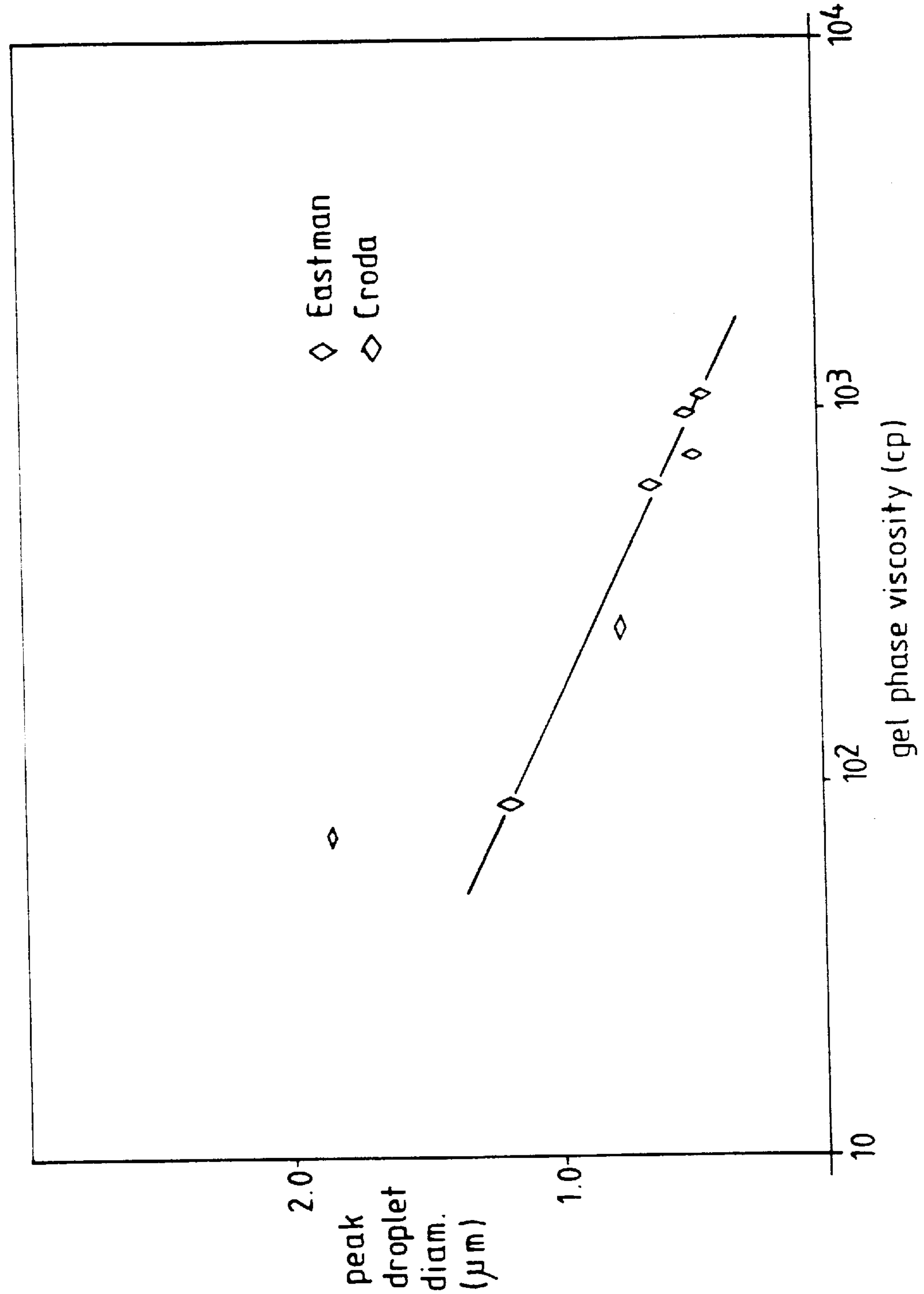
FIG. 1 shows the effect of aqueous gel phase viscosity (altered by changing gel concentration) on oil phase droplet size.

The present invention is directed towards homogenized oil-in-water emulsions. In a particular aspect of the present invention, the oil-in-water emulsion is a photographic dispersion wherein the oil phase comprises droplets of a photographically useful compound, such as an image-dye-forming coupler or a filter agent, dissolved in one or more organic coupler solvents and in which the aqueous phase comprises gelatin. Where required, for example for coating purposes, photographic dispersions in accordance with the invention having increased viscosities may be diluted with water after homogenization, with no apparent effect upon droplet size or stability, in order to reduce their viscosities. After coating, the photographic dispersion is solid or substantially solid under the conditions of pressure and temperature which are normal for the use of photographic film or photographic paper. The oil and aqueous dispersion may be homogenized at an elevated temperature at which the two phases are sufficiently fluid for homogenizing.

The viscosity of the oil-in-water emulsion and particularly a photographic dispersion may be increased by the addition of a viscosity enhancer or “thickener”. For this purpose, a proprietary viscosity enhancer may be used such as, for example, Viscofas™ of ICI or Gantrez™ of GAF Chemicals Corp. Other viscosity increasing agents which may be used in accordance with the present invention may include polyvinylpyridine, polyvinylpyrrolidone (GAF), polyvinylacetate, polyvinylalcohol, Viscalex™ (Messrs. Allied Colloids), polyethyleneglycol (BDH), polyethylene oxide (Aldrich) and Natrosol™ (hydroxyethylcellulose) (Hercules Inc.). Yet other viscosity increasing agents that may be used include latexes and hardeners.

Alternatively, a viscosity increasing surfactant may be used such as Alkanol XC™ of Du Pont. It is known that the addition of a surfactant will decrease droplet size through an interfacial tension-decreasing effect. However, it has now additionally been found that the use of surfactants to increase viscosity also correlates with a decrease in droplet size in accordance with the invention.

The viscosity of the aqueous gel phase may be increased by increasing the concentration of the gelatin. The conventional gelatin used in the photographic art is commercially available inter alia from Messrs. Eastman (e.g. Eastman 852 gelatin or Eastman 890 gelatin) or from Messrs. Croda. The aqueous gel phase of a commercial photographic dispersion typically comprises 8–14% weight gelatin, more typically about 11% weight. In order to increase the viscosity of the dispersion, the concentration of gelatin may be increased by as much as a factor of 2. After homogenization, the aqueous gel phase may be rediluted by the addition of water to reduce the concentration of gelatin to the normal amount.

In yet another aspect of the invention, the viscosity of the oil-in-water emulsion and particularly a photographic dispersion may be increased by replacing at least part of the water in the aqueous gel phase with a polyhydric alcohol such, for example, as glycerol. In some embodiments glycerol may be substituted for water such that 50–80% of the total gel volume is constituted by glycerol, typically say 62%.

By way of example, the viscosity of the aqueous gel phase, for the purposes of the present invention, which may be in the range of about 20 cP to about 2500 cP, may typically be increased by at least 100 cP as measured at 50° C. The viscosity of the dispersion may preferably be increased by a factor of from about 3 to 50 inclusive and may then be preferably in the range of about 100 to 2500 cP, frequently 1000 to 2500 cP.

In a certain embodiment of the invention, the viscosity of the oil-in-water emulsion is reduced after homogenization. In a particular embodiment, oil-in-water emulsions comprising an oil phase dispersed in an aqueous phase having a viscosity of less than 100 cP as measured at 50° C. are obtained, wherein the viscosity of the aqueous phase is increased from below 100 cP to above 100 cP, the oil phase and aqueous phase are subsequently homogenized to form an oil-in-water emulsion, and the viscosity of the aqueous phase is thereafter reduced to below 100 cP as measured at 50° C. Such embodiment is particularly advantageous in forming dispersions with reduced droplet size having desirably low viscosities (i.e., below 100 cP) for coating purposes.

The average droplet size of the oil dispersed phase in accordance with the invention may be in the range 0.1 μm to 2.0 μm. Preferably, the average droplet size may be 0.1 μm to 0.5 μm.

Normally, the homogenizing step will comprise mixing the oil and aqueous phases to form a substantially uniform emulsion or dispersion.

In yet another aspect of the present invention there is provided a photographic element comprising a photographic dispersion in which a dispersed oil phase comprises an image-dye-forming coupler or filter agent in one or more organic solvents contained within an aqueous gel as the continuous phase, in association with a silver halide emulsion layer, wherein the droplet size of the dispersed oil phase is reduced by an increase in the viscosity of the aqueous gel phase prior to homogenization of the oil and aqueous phases.

The photographic element may be a single color element or a multicolor element. Multicolor elements contain image-dye-forming units sensitive to each of the three primary regions of the visible range of the electromagnetic spectrum. Each unit may comprise a single emulsion layer or a plurality of emulsion layers sensitive to a given region of the spectrum. The layers of the element, including the layers of the image-forming units, may be arranged in various orders as known in the art. In an alternative format, the emulsions sensitive to each of the three primary regions of the spectrum may be disposed as a single segmented layer.

A typical multicolor photographic element comprises a support bearing a cyan image-dye-forming unit comprising a red-sensitive silver halide emulsion layer and a cyan dye-forming coupler; a magenta dye image-forming unit comprising at least one green-sensitive silver halide emulsion layer and a magenta dye-forming coupler; a yellow image-dye-forming unit comprising at least one blue-sensitive silver halide emulsion layer and a yellow dye-forming coupler. In particular with regard to the present invention the element may contain one or more UV absorbing layers incorporated into oil-in-water dispersions. Each image-dye-forming unit comprises a dispersed oil phase comprising an image-dye-forming coupler in one or more organic solvents, all contained within an aqueous gel as the continuous phase, wherein the droplet size of the dispersed oil phase is reduced by increasing the viscosity of the gel phase prior to homogenization of the oil and aqueous phases. The element may contain additional layers, such as for example filter layers, interlayers, overcoat layers and subbing layers.

If desired, the photographic element can be used in conjunction with an applied magnetic layer as described in *Research Disclosure*, November 1992, Item 34390 published by Kenneth Mason Publications, Ltd., Dudley Annex, 12a North Street, Emsworth, Hampshire P010 7DQ, England, the contents of which are incorporated herein by reference. When it is desired to employ the inventive materials in a small format film, *Research Disclosure*, June 1994, Item 36230, provides suitable embodiments.

In the following discussion of suitable materials for use in the emulsions and elements of this invention, reference will be made to *Research Disclosure*, September 1994, Item 36544, available as described above, which will be identified hereafter by the term "Research Disclosure". The contents of the Research Disclosure, including the patents and publications referenced therein, are incorporated herein by reference, and the Sections hereafter referred to are Sections of the Research Disclosure.

The silver halide emulsions employed in the elements of this invention can be either negative-working or positive-working. Suitable emulsions and their preparation as well as methods of chemical and spectral sensitization are described in Sections I through V. Various additives such as UV dyes, brighteners, antifoggants, stabilizers, light absorbing and scattering materials, and physical property modifying addenda such as hardeners, coating aids, plasticizers, lubricants and matting agents are described, for example, in Section II and VI through IX. Color materials are described in Sections X through XIII. Scan facilitating is described in Section XIV. Supports, exposure, development systems, and processing methods and agents are described in Sections XV to XX. Certain desirable photographic elements and processing steps are described in *Research Disclosure*, Item 37038, February 1995.

With negative working silver halide a negative image may be formed. Optionally a positive (or reversal) image may be formed.

The color developing agent may be selected from p-phenylenediamines. Typically the agent may be selected from: 4-amino N,N-diethylaniline hydrochloride; 4-amino-3-methyl-N,N-diethylaniline hydrochloride; 4-amino-3-methyl-N-ethyl-N-(2-methanesulfonamido-ethyl)aniline sesquisulfate hydrate; 4-amino-3-methyl-N-ethyl-N-(2-hydroxyethyl)aniline sulfate; 4-amino-3-(2-methanesulfonamido ethyl)-N,N-diethylaniline hydrochloride; and 4-amino-N-ethyl-N-(2-methoxyethyl)-m-toluidine di-p-toluene sulfonic acid.

Said cyan, magenta and yellow dye-forming couplers may be used in combination with other classes of image couplers such as 3-acylamino- and 3-anilino-5-pyrazolones and heterocyclic couplers (e.g. pyrazoloazoles) such as, for example, those described in EP 285,274, U.S. Pat. No. 4,540,654 and EP 119,860; and other 5-pyrazolone couplers containing different ballasts or coupling-off groups such as, for example, those described in U.S. Pat. No. 4,301,235, U.S. Pat. No. 4,853,319 and U.S. Pat. No. 4,351,897. Yellow or cyan colored couplers (e.g. to adjust levels of interlayer correction) and/or masking couplers such as, for example, those described in EP 213,490, Japanese Published Application 58-172,647, U.S. Pat. No. 2,983,608, German Application DE 2,706, 117C, U.K. Patent 1,530,272, Japanese Application A-113935, U.S. Pat. No. 4,070,191 and German Application DE 2,643,965 may also be used. Said masking couplers may be shifted or blocked.

Photographically useful coupling-off groups ("PUGs") are well-known in the art. Such groups can determine the equivalency of the coupler, i.e., whether it is a 2-equivalent or a 4-equivalent coupler, or modify the reactivity of the coupler. Such groups can advantageously affect the layer in which the coupler is coated, or other layers in the photographic recording material, by performing, after release from the coupler, functions such as dye formation, development acceleration or inhibition, bleach acceleration or inhibition, electron transfer facilitation and color correction.

Representative classes of coupling-off groups include halo, alkoxy, aryloxy, heteryloxy, sulfonyloxy, acyloxy, acyl, heterocyclyl, sulfonamido, mercaptotetrazole, mercaptopropionic acid, phosphonyloxy, arylthio, and arylazo. These coupling-off groups are described in the art, for example, in U.S. Pat. Nos. 2,455,169, 3,227,551, 3,432,521, 3,476,563, 3,617,291, 3,880,661, 4,052,212 and 4,134,766; and in U.K. Patents and published application Nos. 1,466, 728, 1,531,927, 1,533,039, 2,006,755A and 2,017,704A, the disclosures of which are incorporated herein by reference.

Thus, the couplers may be used in association with materials that accelerate or otherwise modify the processing steps e.g. of bleaching or fixing to improve the quality of the image. Bleach accelerators described in EP 193,389; EP 301,477; U.S. Pat. No. 4,163,669; U.S. Pat. No. 4,865,956; and U.S. Pat. No. 4,923,784 are particularly useful. Also contemplated is use of the coupler in association with nucleating agents, development accelerators or their precursors (U.K. Patent 2,097,140; U.K. Patent 2,131,188; electron transfer agents (U.S. Pat. No. 4,859,578; U.S. Pat. No. 4,912,025); antifogging and anti color-mixing agents such as derivatives of hydroquinones, aminophenols, amines, gallic acid; catechol; ascorbic acid; hydrazides; sulfonamidophenols; and non color-forming couplers.

The couplers may be used in combination with filter dye layers comprising colloidal silver sol or yellow and/or magenta filter dyes or UV absorbing layers, either as oil-in-water dispersions as herein described, latex dispersions or as solid particle dispersions. Additionally, they may be used with "smearing" couplers (e.g. as described in U.S. Pat. No. 4,366,237; EP 96,570; U.S. Pat. No. 4,420,556; and U.S. Pat. No. 4,543,323). Also, the couplers may in some embodiments be blocked or coated in protected form as described, for example, in Japanese Application 61/258,249 or U.S. Pat. No. 5,019,492.

The couplers may further be used in combination with image-modifying compounds such as "Developer-Inhibitor-Releasing" compounds (DIR's); DIR's useful in conjunction with said couplers are known in the art and examples are described in U.S. Pat. Nos. 3,137,578; 3,148,022; 3,148, 062; 3,227,554; 3,384,657; 3,379,529; 3,615,506; 3,617, 291; 3,620,746; 3,733,201; 4,049,455; 4,095,984; 4,126, 459; 4,149,886; 4,150,228; 4,211,562; 4,248,962; 4,259, 437; 4,362,878; 4,409,323; 4,477,563; 4,782,012; 4,962, 018; 4,500,634; 4,579,634; 4,579,816; 4,607,004; 4,618, 571; 4,678,739; 4,746,600; 4,746,601; 4,791,049; 4,857, 447; 4,865,959; 4,880,342; 4,886,736; 4,937,179; 4,946, 767; 4,948,716; 4,952,485; 4,956,269; 4,959,299; 4,966, 835; 4,985,336 as well as in patent publications GB 1,560, 240; GB 2,007,662; GB 2,032,914; GB 2,099,167; DE 2,842,063, DE 2,937,127; DE 3,636,824; DE 3,644,416 as well as the following European Patent Publications: 272, 573; 335,319; 336,411; 346,899; 362,870; 365,252; 365, 346; 373,382; 376,212; 377,463; 378,236; 384,670; 396, 486; 401,612; 401,613.

Such compounds are also disclosed in "Developer-Inhibitor-Releasing (DIR) Couplers for Color Photography", C. R. Barr. J. R. Thirtle and P. W. Vittum in Photographic Science and Engineering, Vol. 13, p.174 (1969), incorporated herein by reference.

Generally, the developer inhibitor-releasing (DIR) couplers may include a coupler moiety and an inhibitor coupling-off moiety (IN). The inhibitor-releasing couplers may be of the time-delayed type (DIAR couplers) which also include a timing moiety or chemical switch which produces a delayed release of inhibitor. Examples of typical inhibitor moieties are: oxazoles, thiazoles, diazoles, triazoles, oxadiazoles, thiadiazoles, oxathiazoles, thiadiazoles, benzotriazoles, tetrazoles, benzimidazoles, indazoles, isoindazoles, mercaptotetrazoles, selenotetrazoles, mercaptobenzothiazoles, selenobenzothiazoles, mercaptobenzoxazoles, selenobenzoxazoles, mercaptobenzimidazoles, selenobenzimidazoles, benzodiazoles, mercaptooxazoles, mercaptothiadiazoles, mercaptothiazoles, mercaptotriazoles, mercaptothiatriazoles, mercaptotriazoles, mercaptooxadiazoles, mercaptodiazoles, mercaptooxathiazoles, telleurotetrazoles or benzisodiazoles.

The following is a description by way of example only and with reference to the accompanying drawings of methods of carrying the present invention into effect. Note that in the examples all viscosities were measured at 50° C. unless otherwise stated.

EXAMPLE 1

A photographic dispersion, consisting of an oil phase of tricresyl phosphate solvent and 1-(2,4,6-trichlorophenyl)-3-{-[α-(3-tertbutyl-4-hydroxyphenoxy)tetradecane amido]-2-chloroanilino}-5-pyrazolone as dye-foaming coupler, in the ratio of 1:1, was made in a "rotor-stator" high speed mixer, with a gel phase consisting of an Eastman gelatin (15.2 cP) solution plus-surfactant (a constant 0.5% Alkanol XC™). The gelatin concentration was varied so the overall viscosity varied from below 100 cP to above 1000 cP. After a constant homogenizing time, the "peak" droplet size of the resulting dispersions was measured with a Joyce-Loebel disc centrifuge. The results are shown in FIG. 1. It will be seen that as the viscosity increased in the range 100–1000 cP the droplet size decreased from 1.2 $\mu$m to 0.4 $\mu$m.

Using the same conditions but with a Croda (4.8 cP) gelatin, it appeared that the viscosity/droplet size relationship was even steeper.

EXAMPLE 2

Figure 2:
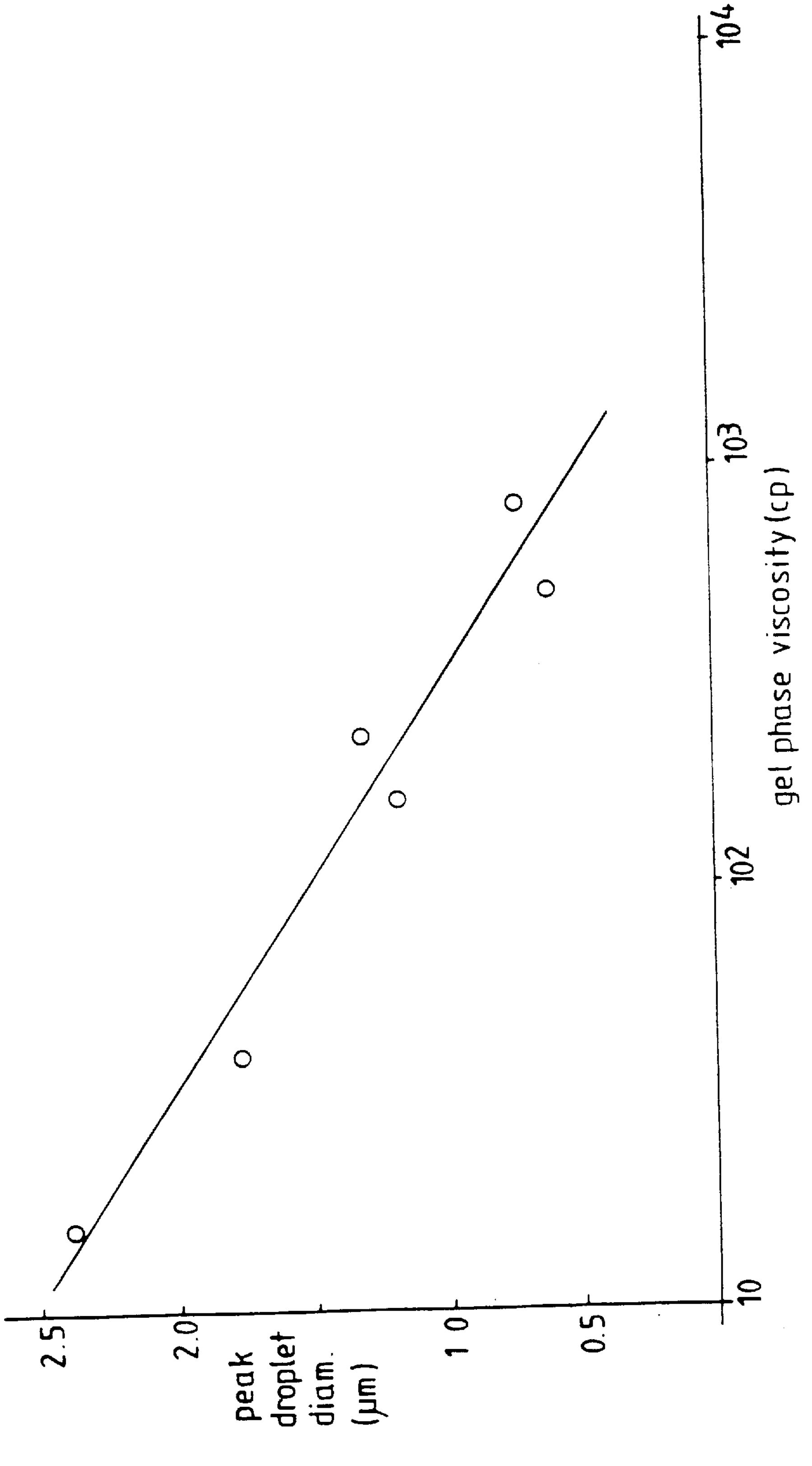
FIG. 2 shows the effect of aqueous gel phase viscosity (varied by adding Viscofas™) on oil phase droplet size.

Using a similar dispersion to that described in Example 1, the gel phase viscosity was varied by adding a commercial viscosity enhancer, Viscofas™ of Messrs. ICI. As the gel viscosity was increased from about 20 cP to about 1000 cP, the peak droplet diameter fell from 2.4 $\mu$m to 0.5 $\mu$m; the results are shown in FIG. 2.

EXAMPLE 3

Figure 3:
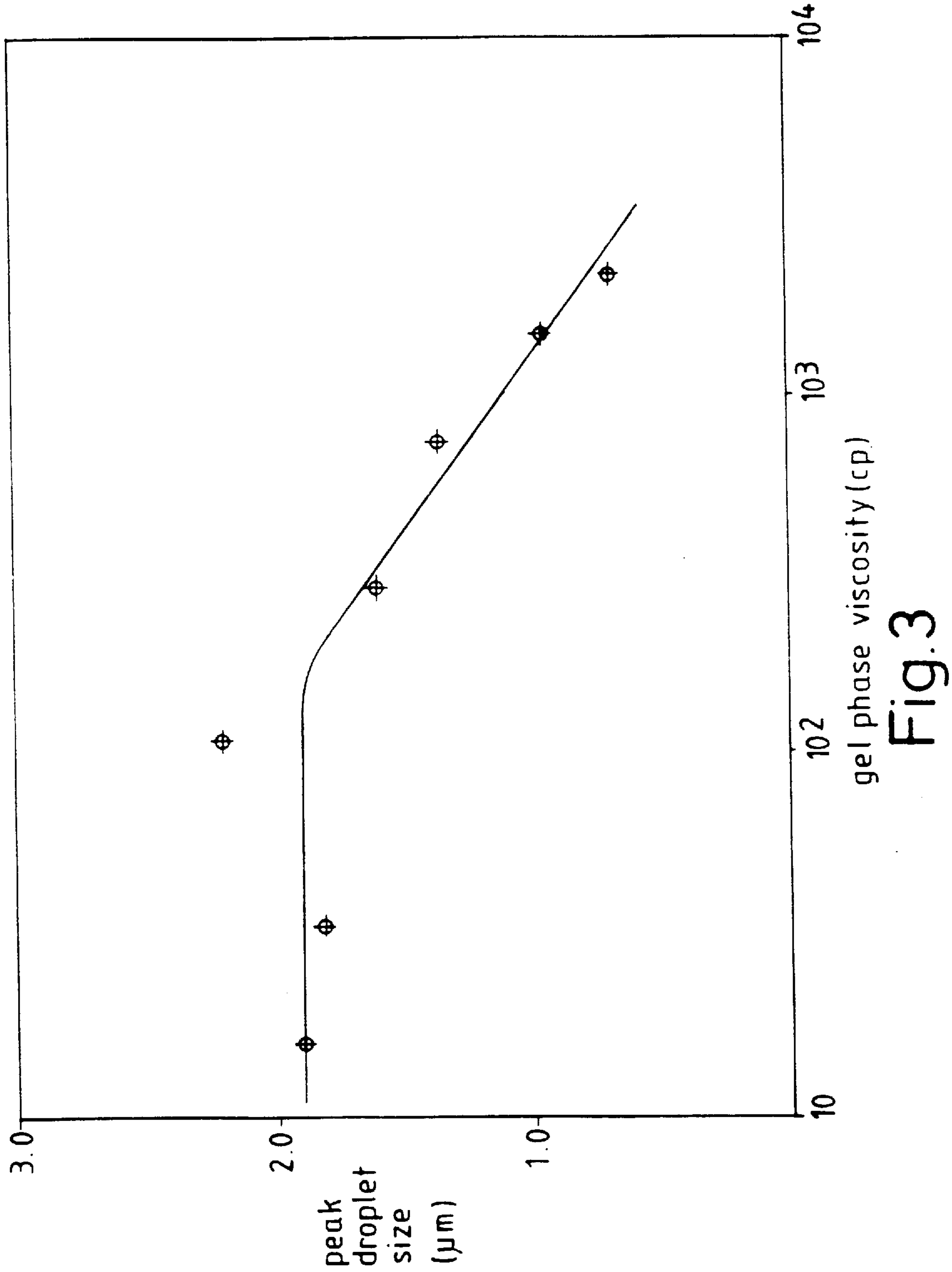
FIG. 3 shows the effect of aqueous gel phase viscosity (varied by adding Gantrez™ AN 149) on oil phase droplet size.

Using a similar dispersion to that described in Example 1, the gel phase viscosity was varied by adding a different commercial viscosity enhancer, viz Gantrez™ AN 149 (from GAF Great Britain Ltd.). This time, as the gel phase viscosity increased over a similar range, there was an initial plateau, but above about 100 cP, the droplet size again fell, from about 1.9 μm to about 0.7 μm at 2000 cP; the results are shown in FIG. 3.

EXAMPLE 4

Figure 4:
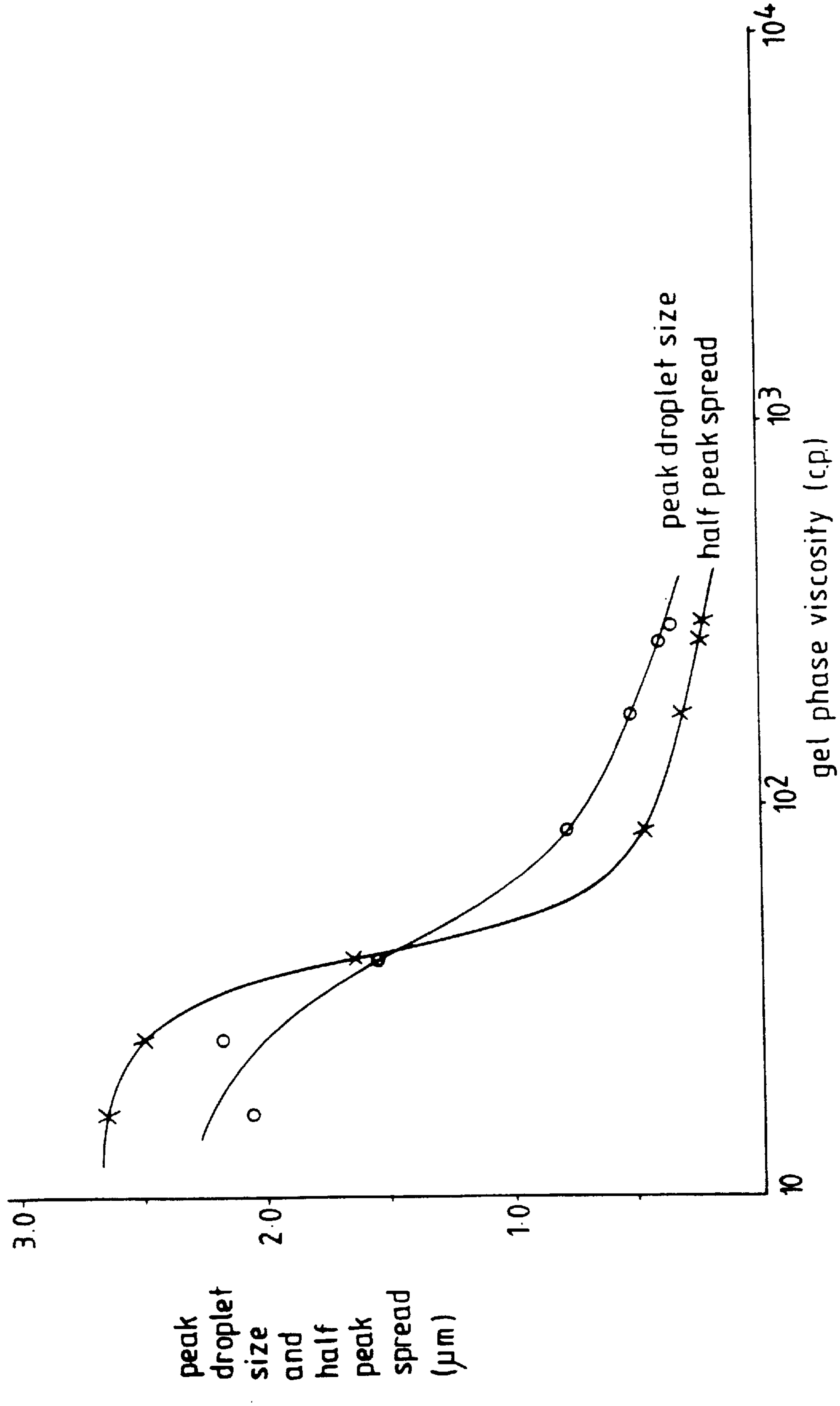
FIG. 4 shows the effect of aqueous gel phase viscosity (altered by adding surfactant) on oil phase droplet size and distribution.

Using a "blank" tricresyl phosphate solvent dispersion (i.e., one in which the oil phase contained only solvent and no dye-forming coupler), the viscosity of the continuous phase (7% gel solution) was increased by adding increasing volumes of surfactant solution (10% aqueous Alkanol XC™). In this case, not only was the mean droplet size measured (by disc centrifuge), but the size distribution was also measured (as the width of the distribution curve at the position of half the peak height). Again, as the gel phase viscosity increased, from 20 to 300 cP, the droplet size decreased from 2.2 μm to 0.4 μm. The size spread also fell (from 2.6 μm to 0.2 μm). The results are shown in FIG. 4.

EXAMPLE 5

Using a yellow-forming photographic dispersion (dispersion A described hereinafter) on a pilot scale high pressure orifice plant, it was found (from a designed experiment having over 100 varying runs) that, with all other conditions constant, the droplet size was inversely proportional to 0.02 times the % gelatin concentration (for concentrations between 8 and 11%), i.e. a gel multiplying factor of −0.02. This means that for a 0.1% increase in gelatin concentration, there will be an expected 0.002 μm decrease in droplet size.

| Dispersion A | | |
|---|---|---|
| Oil phase | | |
| 2-(2'-butoxyethoxy)ethyl acetate | 32.9 | g |
| dibutylphthalate | 30.9 | g |
| α-[4-4-benzyloxyphenylsulphonyl)-phenoxy]-α-(pivaloyl)-2-chloro-5-[γ(2,4-ditertamylphenoxy)butyramido]acetanilide | 129.0 | g |
| Aqueous phase | | |
| dry gelatin (Eastman 852) | 87.7 | g |
| demineralised water | 640 | ml |
| sodium propionate solution (14.8%) | 10.4 | ml |
| 2N propionic acid | 4.6 | ml |
| 10% Alkanol XC solution | 90.0 | ml |

EXAMPLE 6

Using a similar analysis for a UV filter dispersion (Dispersion B as described hereinafter) a similar result to that described in Example 5 was obtained. This time, the gel multiplying factor predicting droplet size was −0.07. This result was obtained on a research-scale plant, and was subsequently confirmed on a larger scale.

| Dispersion B | | |
|---|---|---|
| Oil phase | | |
| 2,4-di-t-butyl-6-benzotriazo1-2-ylphenol | 1.000 | kg |
| 6-t-butyl-2-(5-chlorobenzotriazol-2-yl)-4 methylphenol | 0.1765 | kg |
| 1,4-cyclohexylene-dimethylene bis(2-ethylhexanoate) | 0.3918 | kg |
| dioctylhydroquinone | 0.1341 | kg |

-continued

| Dispersion B | | |
|---|---|---|
| Aqueous phase | | |
| dry gelatin (Eastman 890) | 0.8329 | kg |
| demineralised water | 5.877 | kg |
| sodium propionate | 0.0280 | kg |
| 2N propionic acid | 0.0693 | kg |
| 10% Alkanol XC ™ in water | 0.667 | kg |

EXAMPLE 7

Figure 5:
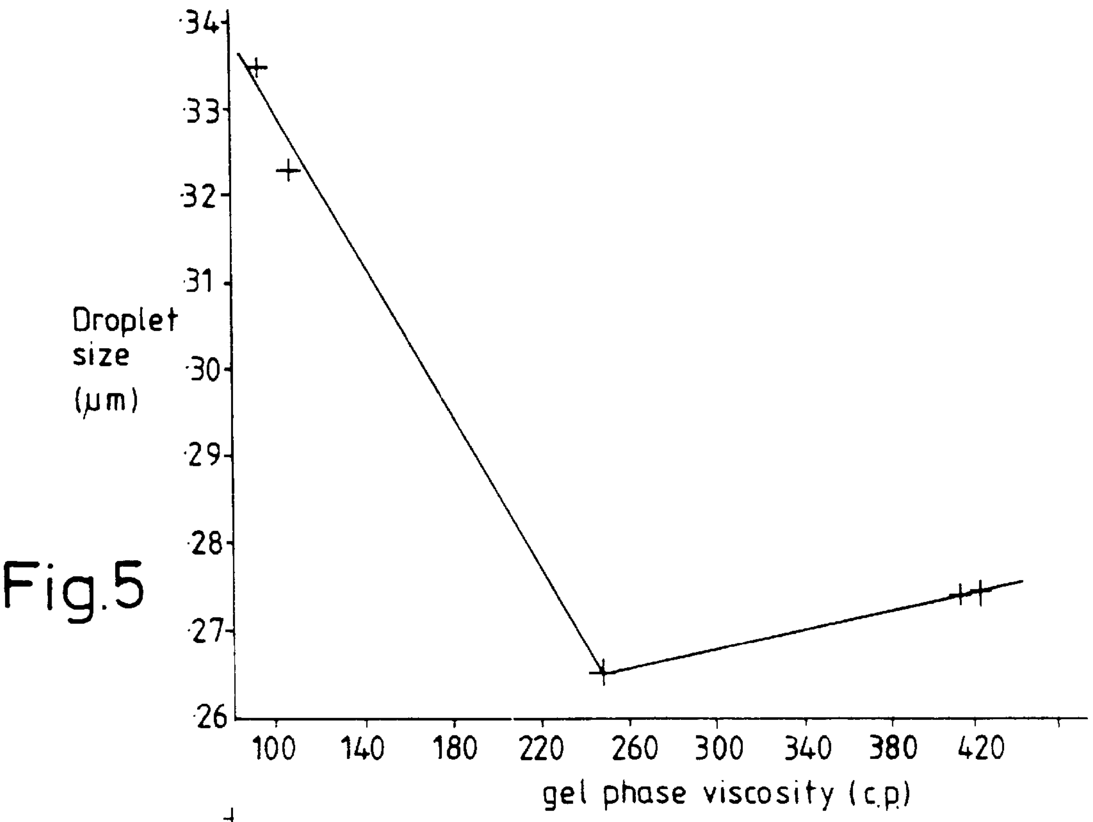
FIG. 5 shows the effect of aqueous gel phase viscosity (altered by adding glycerol) on oil phase droplet size.

Using the basic formula of Dispersion B above, the aqueous phase was modified by serially substituting glycerol for water up to a maximum of glycerol 62% of the total gel volume. The total gel volume was maintained constant in all samples. The effect on the droplet size as a result of changing the viscosity (measured at 500 sec−1 shear rate) in this way is shown in FIG. 5.

EXAMPLE 8

Figure 6:
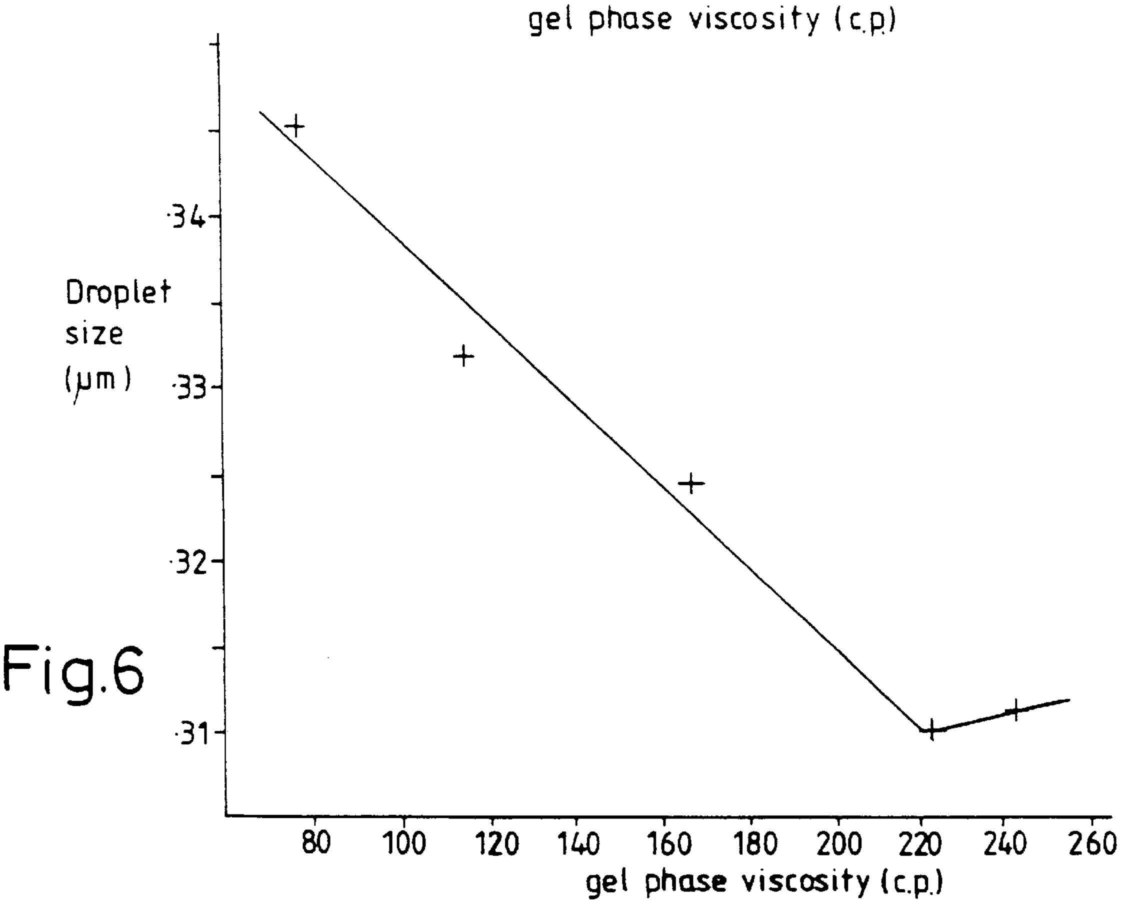
FIG. 6 shows the effect of aqueous gel phase viscosity (altered by adding Gantrez™ S 97) on oil phase droplet size.

Similarly Gantrez™ S 97 (as a 4% aqueous solution) was serially substituted in the same basic formula up to a maximum of 0.8% by total gel volume. The effect on the droplet size as a result of changing the viscosity (measured at 500 sec−1 shear rate) in this way is shown in FIG. 6.

In Examples 7 and 8 it appears that a minimum droplet size is reached when the viscosity has reached a certain value; in both cases, under the conditions cited for the given dispersions, this value is around 230 cP.

EXAMPLE 9

The above Examples show that it is possible to decrease droplet size by increasing the viscosity of the gel phase. A number of experiments have shown that smaller droplets lead to an increase in $D_{max}$ in a range of coatings. To check if a variation in gel phase viscosity was carried through to $D_{max}$ four magenta dye-forming coupler dispersions (Dispersions C–F as described hereafter) were made in which the viscosity was altered by a range of methods, (increasing surfactant concentration, changing surfactant, adding a commercial viscosity enhancer Gantrez™ AN 149 and increasing gelatin concentration); a control sample (Dispersion G) was also included.

Dispersions C–G

The basic formula of the magenta-forming Dispersions C–G was as follows:

| | | |
|---|---|---|
| Oil phase | | |
| 1-(2,4,6-trichlorophenyl)-3-{-[α-(3-tertbutyl-4-hydroxyphenoxy)tetradecane amido]-2-chloroanilino}-5-pyrazolone | 94 | g |
| tricresyl phosphate | 47 | g |
| 2-(2'-butoxyethoxy) ethylacetate | 14 | g |
| dioctylhydroquinone | 9.4 | g |
| 7-t-octyl-2,2,4-trimethylchroman-6-ol | 37 | g |
| Aqueous phase | | |
| dry gelatin | 94 | g |
| demineralized water | 643 | g |
| 10% Alkanol XC | 47 | ml |
| 2N propionic acid | 10 | ml |
| 2N sodium hydroxide | 5 | ml |

Dispersion C included an additional 47 ml 10% Alkanol XC™ (i.e. a total of 94 ml).

In Dispersion D sodium dodecylbenzene sulfonate was substituted for the Alkanol XC™; sodium dodecyl-benzene sulfonate was known from previous experiments to provide a significantly higher gel phase viscosity than the normal Alkanol XC™ surfactant.

In Dispersion Example E the demineralised water was replaced with a 1.5% aqueous solution of Gantrez™ AN 149 viscosity enhancer.

In Dispersion F a total of 188 g dry gelatin and 549 g water was used in place of the amounts cited above (94 g and 645 g respectively).

Dispersion G was the control formulated as above.

Each of Dispersions C–G was homogenized under identical conditions.

Photographic Evaluation of Magenta Dye-Forming Coupler Dispersions

The magenta-forming dispersions were incorporated into photographic coatings containing a silver bromoiodide emulsion, on a transparent support, according to the following coating diagram:

| | | |
|---|---|---|
| Gel Supercoat: | Gelatin | 1.50 $g/m^2$ |
| Emulsion Layer: | (as above) | |
| Support: | Cellulose acetate | |

The 2-(2'-butoxyethoxy)ethylacetate was included as an auxiliary solvent to aid in dispersion preparation and was removed by washing the dispersion for 6 hours at 4° C. and pH 6.0.

Sensitometric Testing

The experimental photographic coatings prepared in this way were slit and chopped into 30 cm×35 mm test strips. After hardening the strips were exposed (1.0 sec) through a 0–4.0 neutral density step wedge (0.2 ND step increments) and Daylight V. Wratten 35+38A filters and 0.3 ND filter then processed through a standard C-41 process as described in the British Journal of Photography Annual (1988) 196–198 using the following steps and process times:

| | |
|---|---|
| Developer | 2.5 minutes |
| Bleach | 4.0 minutes |
| Wash | 2.0 minutes |
| Fix | 4.0 minutes |
| Wash | 2.0 minutes |

For each test strip, Status M densities were measured as a function of exposure using a spectral array automatic transmission densitometer. Measurements of maximum density ($D_{max}$) were obtained from plots of density vs. log exposure (DlogE curves).

Figure 7:
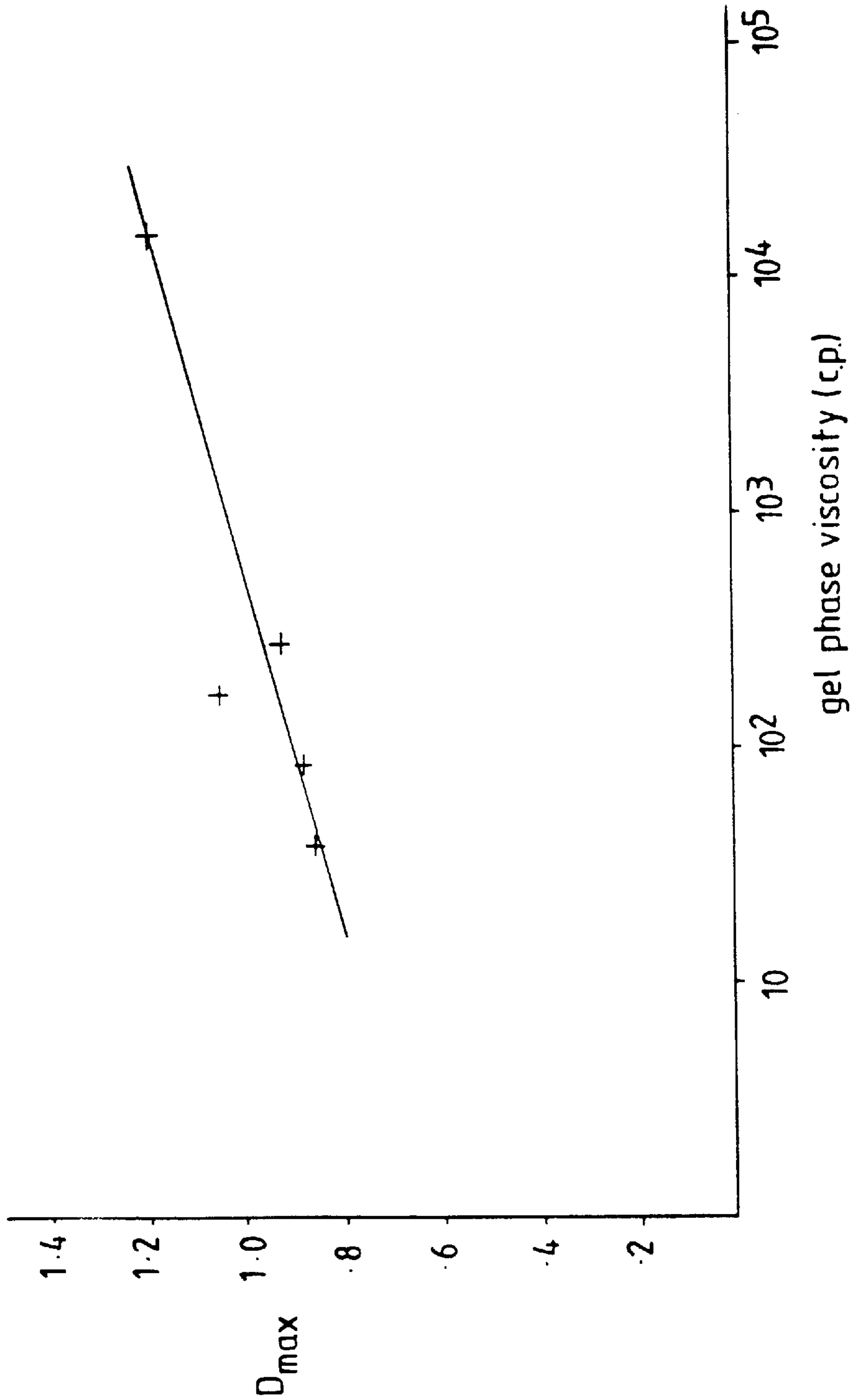
FIG. 7 shows the effect of aqueous gel phase viscosity (altered by various methods) on coated $D_{max}$ for five magenta dye-forming coupler dispersions.

The results are shown, for a single layer coating on film base, in FIG. 7. It is apparent that by whatever means the gel phase viscosity is increased, an increase in viscosity generated an increase in $D_{max}$.

In accordance with the present invention as hereinbefore described therefore the droplet size of an oil-in-water emulsion such as a photographic dispersion may be reduced by increasing the gel phase viscosity. In the photographic art, this represents a considerable advantage, as a reduced droplet size in the dispersed organic phase comprising coupler solvent and dye-forming coupler leads to an increased reactivity between the dye-forming coupler and oxidized developer.

The invention can be used to produce commercial photographic film or paper having the same or a similar droplet size as compared with films or papers which are commercially available at the time of writing, by employing a more economical manufacturing process, as fewer passes through a homogenization may be required to produce the same droplet size. Alternatively, the invention can be used to form new photographic paper or film products which have a significantly smaller droplet size as compared with films or papers which are available at the time of writing.

The viscosity of the emulsion or dispersion can be increased by using proprietary viscosity enhancers or suitable surfactants. Alternatively, an increased concentration of gelatin in the aqueous phase can be employed. It is well known to those skilled in the art that diluting photographic dispersions with moderate amounts of water has no detectable effect upon the droplet size or stability. The concentrated aqueous gel phase can therefore be rediluted after homogenizing, without affecting the droplet size produced in the homogenization step. Since most production dispersions have a "melt-making" step after the homogenization step, the present invention can be readily incorporated in existing manufacturing processes to increase the reactivity (reduce the droplet size) of the dispersions. The viscosity may be reduced even more efficiently by adding suitable aqueous solutions of proteins and non-ionic surfactants as described in WO-A-92/01971.

I claim:

1. A method of forming a photographic dispersion comprising an aqueous gelatin continuous phase and a dispersed oil phase having a reduced droplet size in the oil phase, said method comprising increasing the viscosity of the aqueous phase prior to homogenization, and subsequently homogenizing the oil and aqueous phases to form an oil-in-water emulsion, wherein the increase in viscosity prior to homogenization is by a factor of from about 3 to about 50 inclusive and the viscosity of the aqueous phase during homogenization is in the range of about 100 cP to about 2500 cP.

2. A method as claimed in claim 1 wherein a viscosity enhancer is used for increasing the viscosity of the aqueous phase.

3. A method as claimed in claim 1 wherein the viscosity of the aqueous phase is increased by replacing at least part of the water therein with a polyhydric alcohol.

4. A method as claimed in claim 1 wherein the viscosity of the aqueous phase is increased by increasing the concentration of gelatin in the aqueous phase.

5. A method as claimed in claim 1 wherein the viscosity of the aqueous phase is increased by the addition of a surfactant.

6. A method as claimed in claim 1 wherein the viscosity of the aqueous phase is increased by at least 100 cP as measured at 50° C.

7. A method as claimed in claim 1 wherein the dispersion is homogenized at an elevated temperature at which the aqueous and oil phases are sufficiently fluid for homogenizing.

8. A method as claimed in claim 1 wherein the viscosity of the aqueous phase is decreased after homogenization.

9. A method as claimed in claim 8, wherein the viscosity of the aqueous phase is increased from below 100 cP to above 100 cP, the oil phase and aqueous phase are subsequently homogenized to form an oil-in-water emulsion, and the viscosity of the aqueous phase is thereafter reduced to below 100 cP as measured at 50° C.

10. A method as claimed in claim 9 wherein a viscosity enhancer is used for increasing the viscosity of the aqueous phase.

11. A method as claimed in claim 9 wherein the viscosity of the aqueous phase is increased by replacing at least part of the water therein with a polyhydric alcohol.

12. A method as claimed in claim 9 wherein the viscosity of the aqueous phase is increased by increasing the concentration of gelatin in the aqueous phase.

13. A method as claimed in claim 9 wherein the viscosity of the aqueous phase is increased by the addition of a surfactant.

14. A method as claimed in claim 9 wherein the viscosity of the aqueous phase is increased by at least 100 cP as measured at 50° C.

15. A method as claimed in claim 9 wherein the dispersion is homogenized at an elevated temperature at which the aqueous and oil phases are sufficiently fluid for homogenizing.

* * * * *